United States Patent [19]
Potter

[11] 3,866,989
[45] Feb. 18, 1975

[54] LOCKING DEVICE FOR A BEARING

[75] Inventor: Howell L. Potter, New Britain, Conn.

[73] Assignee: Textron Inc., Providence, R.I.

[22] Filed: Aug. 1, 1973

[21] Appl. No.: 384,833

Related U.S. Application Data

[62] Division of Ser. No. 194,676, Nov. 1, 1971, Pat. No. 3,792,880.

[52] U.S. Cl. .............................................. 308/236
[51] Int. Cl. ............................................. F16c 33/30
[58] Field of Search ............ 308/236; 403/372, 376

[56] References Cited
UNITED STATES PATENTS
2,584,740  2/1952  Reynolds ........................... 403/376
3,391,954  1/1968  Callahan ............................ 403/372

*Primary Examiner*—M. Henson Wood, Jr.
*Assistant Examiner*—Richard A. Bertsch
*Attorney, Agent, or Firm*—Sandoe, Hopgood & Calimafde

[57] ABSTRACT

The invention contemplates a clip means having relatively free but unit-handling assembled relation to the bearing ring or the like which it is to secure, in the ultimately fitted, installed condition of the ring. An axial tongue of the clip is held in an eccentric arcuate relief in the cylindrical ring surface to be mounted. The end of said axial tongue is hooked and held in a groove located within the relief area. The assembled and installed position of the ring is secured by angularly displacing the clip, and therefore the tongue, toward one of the circumferential limits of the relief.

19 Claims, 11 Drawing Figures

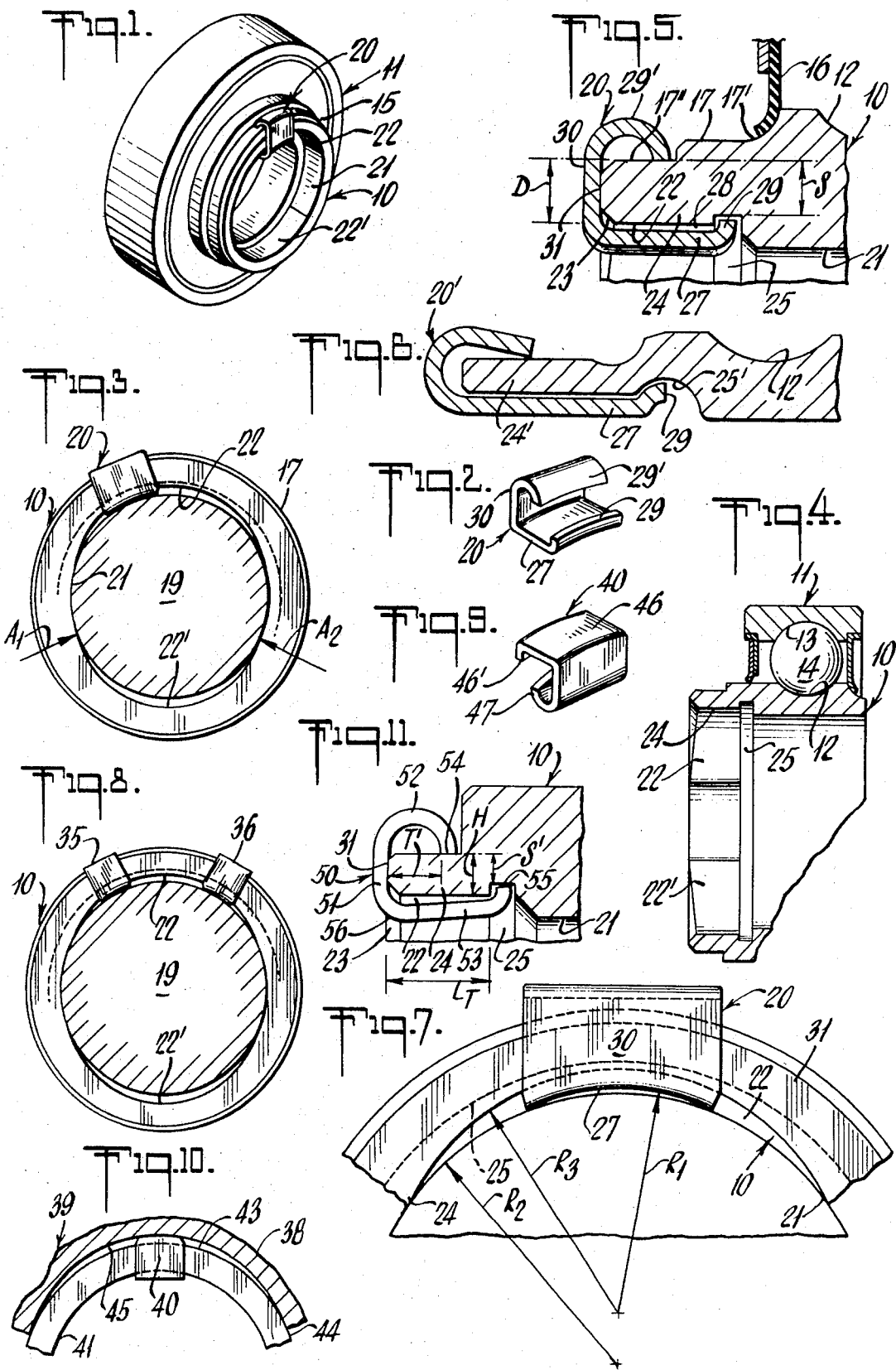

LOCKING DEVICE FOR A BEARING

This is a division of application Ser. No. 194,676, filed Nov. 1, 1971, now Pat. No. 3,792,880.

The invention relates to locking means for securely mounting a bearing ring or the like.

It is an object of the invention to provide improved means of the character indicated.

Another object is to provide improved locking means involving a minimum of additional axial length to an assembled bearing or the like.

A further object is to achieve the foregoing objects with a structure which will not substantially affect the running efficiency of an antrifriction bearing embodying the invention.

A specific object is to provide a ring lock or clip of suitably formed spring-ribbon stock, self-retained on the inner ring of a bearing, and enabling simple and free assembly of the ring and clip to a shaft, followed by angular dispacement of the clip to achieve the locked condition.

Another specific object is to provide a ring lock or clip of suitably formed spring-ribbon stock, self-retained on the outer ring of a bearing, and enabling simple and free assembly of the ring and clip to the ultimate mounting bore, followed by angular dispacement of the clip to achieve the locked condition.

It is a general object to achieve the above objects with a simple construction involving a minimum of manufacturing expense, a maximum of locking effectiveness, and simplicity of use.

Other objects and various further features of novelty and invention will be pointed out or will occur to those skilled in the art from a reading of the following specification in conjunction with the accompanying drawings. In said drawings, which show, for illustrative purposes only, preferred forms of the invention:

FIG. 1 is a perspective view of an antifriction bearing, assembled in unit-handling relation with locking means of the invention;

FIG. 2 is an enlarged perspective view of the locking element or clip in FIG. 1;

FIG. 3 is an end elevation of the locked ring part of FIG. 1, shown in locked condition on a shaft, the shaft being shown in section, for a better viewing of the parts relationship;

FIG. 4 is a longitudinal sectional view of the bearing of FIG. 1, prior to locking-element assembly thereto;

FIG. 5 is an enlarged fragmentary longitudinal sectional view of locking elements in preassembled, unlocked relation;

FIG. 6 is a simplified fragmentary sectional view to show a modified clip and ring configuration;

FIG. 7 is an enlarged fragmentary end elevation of the locking elements of FIG. 5;

FIG. 8 is a view similar to FIG. 3, to show a modification;

FIG. 9 is a view similar to FIG. 2, to show a modification;

FIG. 10 is a fragmentary end elevation of a bearing ring employing the modified locking element of FIG. 9 and locking said ring in a mounting bore, the mounting element being shown in section, for a better viewing of the parts relation; and FIG. 11 is an enlarged fragmentary sectional view of another modification of parts shown in FIG. 5.

Referring to FIGS. 2 to 5 and 7, the invention is shown in application to an antifriction bearing comprising inner and outer rings 10-11 having opposed raceways 12-13, and with plural antifriction elements 14 riding the raceways and holding the rings 10-11 in relatively rotatable and coaxial relation. Shield and/or seal means may close the respective ends of the bearing; at the end which is exposed in FIG. 1, such means includes an outer metal plate 15 carried by outer ring 11. Plate 15 may be axially flared at its inner limit to protect a resilient seal which is formed and stressed for wiping engagement with the outer cylindrical surface 17 of ring 10; in the form shown, however, the ring seal is established at contact of seal 16 with a rabbet 17'. In any case, the axial end of ring 10 projects outwardly beyond such seal region, for locking purposes to be explained, in connection with mounting to a shaft 19.

Locking-clip means 20 of the invention is carried in unit-handling relation with the projecting end of inner ring 10. For this purpose, the cylindrical bore 21 of ring 10 is relieved at 22 over a limited arcuate extent about an axis eccentric to the bearing axis, and the axial extent of the relief 22 preferably terminates at the general plane of shield and seal mounting, thus leaving the substantial body of ring 10 unaffected by the relief, so that race distortion attributable to locking action is inconsequential. The eccentric offset is in the order of 10 to 15 percent of the radius of bore 21, and the radius of the arcuate relief may be in the order of 85 to 90 percent of the bore radius. Thus, the limited arcuate extent of the relief 22 is in the range of substantially 90 to 140 degrees; it is preferably 100 to 120 degrees. Preferably also, a second relief 22' is symmetrically formed at the diametrically opposite location; both reliefs 22-22' may be readily formed by the same milling cutter and in the same work set-up, being produced by like radial feeds, in succession and in opposite directions, with respect to the central axis of ring 10. A suitably formed such milling cutter may also produce an eccentric chamfer, as at 23, at the edge of the relief.

To retain the clip means 20, the inner surface of the projecting end of ring 10 includes a circumferentially extending radial flange formation 24, which in the form shown is defined between (a) the outer axial end of the ring and (b) a circumferentially continuous radial groove 25 located at the axially inner end of the reliefs 22-22'.

As best seen in FIG. 2, the clip means 20 is of generally C-shape; it is formed of stiffly compliant material such as spring-ribbon steel, suitably hardened after shaping. The lower end of the C-shape is tongue 27, of circumferential extent substantially less than the circumferential extent of the relief 22 in which it is received. The thickness of tongue 27 is such as to be so received with a clearance, designated 28 in FIG. 5, at the location of maximum radial relief. The end of the tongue being so shaped as to fit into said groove 25 as shown.

The tongue end of the C-shape of clip means 20 is hooked, at 29, for engagement over flange 24, being retained in groove 25, and a substantially flat integral central section 30 connects the tongue 27 to the other end 29', bent for overlap with surface 17, or with a reduced cylindrical outer surface portion 17" thereof; for stability, the radially inwardly directed edge 29 is arcuate, as shown, to pilot on the bottom of groove 25. Preferably, the axial span between the hooked end 29 and the flat central section 30 is such, in relation to the axial span between the end face 31 (of ring 10) and the adjacent wall of groove 25, and the effective radial spans S of the ring (surface 17″ to groove 25) and of the clip (between convergent ends 29–29′) is substantially the same that the clip means 20 is naturally oriented and stabilized in the manner shown in FIG. 5. Preferably also, the radial span S is less than the radial distance D between surface 17″ and the maximum radial depth of relief 22, thus assuring self-retention in unstressed condition of the clip means to provide ready actuation in the circumferential direction needed to achieve lock action.

FIG. 6 illustrates a modification of the combination of FIGS. 1 to 5, snap-retained on a more elongate flange projections 24′. In FIG. 6, a clip 20′ is characterized by a more flatly bent outer end 29′ and a more elongate inner end or tongue 27. The axially inner end 29 of the tongue is gently rounded, for smooth detent-like retention in a similarly profiled groove 25′.

More specifically, the tongue 27 is preferably arcuate for accomodation of greater tongue body in the crescent-shaped void created by relief 22. As seen in FIG. 7, the radius $R_1$ of this arc is preferably no greater than the bore radius $R_2$ and may be in the order of 85 to 100 percent thereof; the tongue radius also is preferably at least no less than the relief radius $R_3$. With such relationships, it will be appreciated that regardless of the direction of angular displacement of tongue 27 to set the lock, the high points of wedging contact will always occur at least at one of the circumferential ends of the arc of the tongue. It will be appreciated, however, that for many applications an adequate fastening of the inner ring to a shaft may be achieved without strict adherence to these stated preferred dimensional relationships.

FIG. 8 illustrates a modification, for particular use in the situation in which the bearing is to be reversibly operated. Parts in FIG. 8 are as previously described, except that two like clips 35–36 of the invention are employed, to provide wedge-lock action with respect to shaft 19, regardless of the direction of rotation. Each of the lock clips 35–36 may be entered into a different one of the reliefs 22–22′, and then displaced to jam in opposite directions, or they may be recieved in the same single relief 22, as shown. For this purpose, the clips 35–36 may be in all respects as described for clip 20 of FIG. 2, except that they are shown with lesser arcuate extent, to enable them to be in side-by-side adjacency, at the radially deepest part of relief 22, when assembled to shaft 19. A simple driving tool, such as a hammer, cold chisel or the like, will suffice to spread and ram the clips 35–36 into their oppositely directed wedge positions shown.

FIGS. 9 and 10 illustrate that principles of the invention are also applicable to the retention of a ring, such as the outer bearing ring 37 in a mounting bore 38, such as the bore of a hub forming part of a pulley, gear or the lke 39 which rides on the bearing. It will be understood that outer ring 37 is formed as described for inner ring 10, except that inwardly and outwardly directed parts and functions are reversed. Thus, the locking clip 40 is carried in unit-handling preassembled relation with an axially projecting end of the ring 37. The flange 41, extends radially outwardly, and the retaining groove (not shown) by which it is defined, both extend radially outwardly. The relief 43 is preferably one of two, formed at diametrically opposed locations in cylindrical outer surface 44 of the outer ring 37. The crescent-shaped void 45 is thus defined for accommodating lock action, upon wedging the clip tongue 46 angularly in the direction of a circumferential limit of the void 45, reliance being placed on engagement of the hooked end 46′ of tongue 46 to locate in the retaining groove. The other end 47 of the clip is a radially outwardly directed bent end of the clip 40. As in the modification in FIG. 6, however, this said bent end need not be pronounced.

The described construction in all its forms is seen to meet all stated objects. It represents almost an irreducible minimum in cost, and it is highly effective. When the lock is set, for the case of opposed reliefs (e.g., 22–22′), stability is enhanced by virtue of local clamp reaction at the widely spaced locales at ends of the opposite relief 22′, as suggested by heavy arrows $A_1$–$A_2$ in FIG. 3. The clip means of the invention may be applied by the bearing manufacturer, thus becoming part of the preassembled bearing, for unit-handling therewith. Axial pressure, as by a light hammer tap, is all that is needed to cause the tongue end (27 or 46) to engage and respond to cam action by the ring chamfer (23), so that the clip may snap into its desired retained position once it clears the flange.

The principles governing shape of tongue 27 apply equally to tongue 46, except of course that the curvatures are reversed. Thus, tongue 46 is preferably arcuate, with a radius of curvature that is at least no less than the radius of the outer cylindrical surface 44 being, for example, in the order of 100 to 115 percent thereof, the tongue radius also is preferably at least no greater than the radius of relief 43.

FIG. 11 illustrates that clip means 50 of the invention can be and preferably is formed to be normally resiliently stressed in its unit-handling assembly to a ring member 10, thereby frictionally retaining a desired angular position on the inner ring, all as illustrated in FIG. 11. In FIG. 11, most of parts have elements and formations already described, and so the same reference numbers are used. However, in FIG. 11, the effective inside radial span S′ and offset T′ of the clip 50 are such, in relation to the effective radial height H and axial thickness T of flange 24 (at the location of maximum eccentric relief 22), that light resilient frictional drag characterizes the clip-to-ring engagement, even in the absence of and preferably also after shaft insertion. For the form shown, clip 50 has an upstanding central portion 51 between a bent end 52 and a tongue end 53, hooked at 55, and the tongue end 53 is bent inward, to a slightly acute angle with respect to portion 51, to establish the reduced span S′ noted above. Thus, the modified clip 50, when assembled to ring 10, is slightly outwardly sprung in the FIG. 11 position, permitting light frictional hold by way of ring contact at 54–31–55.

In use, as when two clips 50 are set on a single ring (as in the manner explained above for clips 35–36 of FIG. 8), the frictional-engagement property of clips 50 will enable both of them to stay in adjacent relation at the location of maximum relief at the eccentric surface 22. This enables simple shaft-insertion, in the course of which the heel region 56 (FIG. 12) of each clip 50 lightly interferes with, and rides upon, the inserted shaft (19, not shown in FIG. 11). But it will be noted that even though contact at 54 or 55 may be thereby relieved to the point of opening a clearance (at 54 or 55), there nevertheless remains a slight resiliently stressed deformation of the clip, by means of which a set angular position can be retained. Once the ring and its shaft are adequately positioned., the clips 50 may be spread for oppositely wedged ring-to-shaft contact as by use of a simple tool. In the fully wedged position, the tongue parts 53 of clips 50 will of course lie primarily "flat" along the shaft and the eccentric counter bore, as will be understood.

What is claimed is:

1. In an antifriction bearing, inner and outer ring components having opposed raceways and coaxially spaced by antifriction elements in said raceways, one of said ring components having inner and outer cylindrical surfaces one of which is sized to fit a given cylindrical mounting profile, said one ring component having an annular axially extending end portion projecting in axially offset relation to a body portion containing the raceway of said one ring component, said end portion extending radially between spaced geometric cylinders containing said inner and outer cylindrical surfaces, said end portion adjacent said one surface being relieved over a limited arcuate extent about an axis eccentric to the axis of said one surface, said end portion including circumferentially extending radial flange means defining an axially inner retaining wall portion, and clip means comprising a generally C-shaped stiffly compliant metal ribbon engaging over the axially outer end of said flange means at a limited location thereof, said clip means including a tongue of thickness less than the maximum extent of eccentric relief and of arcuate extent substantially less than said limited arcuate extent, said tongue projecting axially inwardly within the relief region of said one ring component, said clip means being limited to substantially said limited angular location, and a radially projecting integral flange portion on said tongue extending into retaining radial overlap with the axially inner wall portion of said flange means.

2. In combination, a bearing-ring component having inner and outer cylindrical surfaces one of which is sized to fit a given cylindrical mounting profile, said ring component having an annular axially extending end portion projecting in axially offset relation to a body portion, said end portion extending radially between spaced geometric cylinders containing said inner and outer cylindrical surfaces, said end portion adjacent said one surface being relieved over a limited arcuate extent about an axis eccentric to the axis of said one surface, said end portion including circumferentially extending radial flange means defining an axially inner retaining wall portion, and clip means comprising a generally C-shaped stiffly compliant metal ribbon engaging over the axially outer end of said flange means at a limited location thereof, said clip means including a tongue of thickness less than the maximum extent of eccentric relief and of arcuate extent substantially less than said limited arcuate extent, said tongue projecting axially inwardly within the relief region of said ring component, said clip means being limited to substantially said limited angular location, and a radially projecting integral flange portion on said tongue extending into retaining radial overlap with the axially inner wall portion of said flange means.

3. The combination of claim 2, in which said ring component is one of two relatively rotatable rings of an assembled bearing.

4. The combination according to claim 2, in which the limited arcuate extent of said relief is less than 180 degrees about the bearing-ring axis.

5. The combination according to claim 4, in which said limited arcuate extent is in the range between 90 degrees and 140 degrees.

6. The combination according to claim 4, in which said limited arcuate extent is in the range of substantially 100 to 120 degrees.

7. The combination according to claim 4, in which said relief is provided in duplicate, symmetrically disposed and equally spaced about the axis of the bearing-ring component, whereby upon fitted assembly of the bearing ring component to the member which is to have drive or support relation thereto, and upon angularly displacing said clip means to jam toward one convergent end of the crescent cavity defined between the first-mentioned recess and the fitted member, reacting support on the opposite side of the bearing axis is generated at regions adjacent both the circumferential limits of the duplicate eccentric relief.

8. The combination according to claim 2, in which said clip means is provided in duplicate, the thickness of both tongues when in side-by-side adjacency being such as to be fully received within the relief region, whereby upon fitted assembly of the bearing-ring component to the member which is to have drive or support relation thereto, each of said clip means may be displaced to jam toward a different one of the circumferential ends of the crescent cavity defined between the recess and the fitted member.

9. The combination according to claim 2, in which said flange means is defined by a circumferentially continuous radial groove in said one surface at said end portion.

10. The combination according to claim 2, in which the other surface of said ring component has an antifriction-element raceway formation at a location axially offset from said end portion, said flange means being defined by a circumferentially continuous radial groove in said one surface at an axial location between the plane of the edge of the raceway close to said axial end and said axial end.

11. The combination according to claim 10, in which the axially outer end of said one surface has a chamfer of radial extent which is in the order of magnitude of the depth of said groove, at the point of maximum relief, whereby said clip means may be axially assembled to said end by relying on the chamfer as a radial cam to spread and outwardly deform said clip means, for retention by resilient restoration to its unstressed state upon registry with said groove.

12. The combination according to claim 2, in which said ring component is an inner bearing ring of an antifriction bearing, with the said relief in the bore thereof.

13. The combination according to claim 12, in which the arc of said tongue is of radius which is substantially the bore radius except for the end of said tongue.

14. The combination according to claim 12, in which the arc of said tongue is of radius which is at least no greater than the bore radius except for end of said tongue.

15. The combination according to claim 2, in which said ring component is an outer bearing ring of an antifriction bearing, with the said relief in the outer surface thereof.

16. The combination according to claim 15, in which the arc of said tongue is of radius which is at least no less than the relief radius except for the end of said tongue.

17. The combination according to claim 15, in which the arc of said tongue is of radius which is substantially the radius of the outer surface of said outer bearing ring except for the end of said tongue.

18. The combination according to claim 15, in which the arc of said tongue is of radius which is at least no less than the radius of the outer surface of said outer bearing ring except for the end of said tongue.

19. The combination according to claim 15, in which the arc of said tongue is of radius which is at least no greater than the relief radius except for the end of said tongue.

* * * * *